(12) United States Patent
Nakajima et al.

(10) Patent No.: US 9,458,879 B2
(45) Date of Patent: Oct. 4, 2016

(54) TRANSPORTING MEMBER, DEVELOPING DEVICE, AND IMAGE FORMING APPARATUS

(71) Applicant: FUJI XEROX CO., LTD., Minato-ku, Tokyo (JP)

(72) Inventors: Yoshitaka Nakajima, Kanagawa (JP); Makoto Hirota, Kanagawa (JP); Toshihiro Kanematsu, Kanagawa (JP); Shota Oba, Kanagawa (JP); Shigeru Inaba, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 225 days.

(21) Appl. No.: 14/056,734

(22) Filed: Oct. 17, 2013

(65) Prior Publication Data

US 2014/0235415 A1 Aug. 21, 2014

(30) Foreign Application Priority Data

Feb. 20, 2013 (JP) ................. 2013-030684

(51) Int. Cl.
*G03G 15/08* (2006.01)
*F16C 13/00* (2006.01)

(52) U.S. Cl.
CPC ........... *F16C 13/00* (2013.01); *G03G 15/0891* (2013.01); *G03G 15/0889* (2013.01); *G03G15/0893* (2013.01); *G03G 2215/0827* (2013.01); *G03G 2215/0833* (2013.01); *G03G 2215/0838* (2013.01)

(58) Field of Classification Search
CPC ...................... G03G 15/0889; G03G 15/0891; G03G 15/0893; G03G 15/0887; G03G 2215/0816; G03G 2215/0827; G03G 2215/083; G03G 2215/0833; G03G 2215/0838; G03G 2215/0802; Y10T 29/49544; Y10T 29/49547; Y10T 29/4956; Y10T 29/49565
See application file for complete search history.

(56) References Cited

U.S. PATENT DOCUMENTS

| 2009/0067878 A1* | 3/2009 | Tateyama | G03G 15/0855 399/111 |
| 2013/0149009 A1* | 6/2013 | Iwata | G03G 15/0836 399/254 |

FOREIGN PATENT DOCUMENTS

| JP | 63-98681 A | 4/1988 |
| JP | 2006-178381 A | 7/2006 |

(Continued)

OTHER PUBLICATIONS

Communication dated Apr. 12, 2016 from the Japanese Patent Office issued in corresponding Application No. 2013-030684.

(Continued)

*Primary Examiner* — Christopher Besler
(74) *Attorney, Agent, or Firm* — Sughrue Mion, PLLC

(57) ABSTRACT

A transporting member includes multiple helical blades that helically extend around a rotation shaft and that have an upstream-side blade and a downstream-side blade, an end portion of the upstream-side blade and an end portion of the downstream-side blade overlapping in a direction perpendicular to an axial direction of the rotation shaft, the multiple helical blades transporting an object in the axial direction via rotation of the rotation shaft; a gap portion that divides the upstream-side blade and the downstream-side blade, the upstream-side blade and the downstream-side blade being arranged at a certain angular interval in a circumferential direction of the rotation shaft; and a regulating portion that regulates an amount of the object that passes through a space between the upstream-side blade and the downstream-side blade in a direction in which the object is transported.

9 Claims, 7 Drawing Sheets

(56) References Cited

FOREIGN PATENT DOCUMENTS

| JP | 2008-250290 A | 10/2008 |
| JP | 2010-256429 A | 11/2010 |

OTHER PUBLICATIONS

Communication dated Dec. 22, 2015 from the Japanese Patent Office issued in corresponding Application No. 2013-030684.

* cited by examiner

FIG. 8A
FIG. 8B
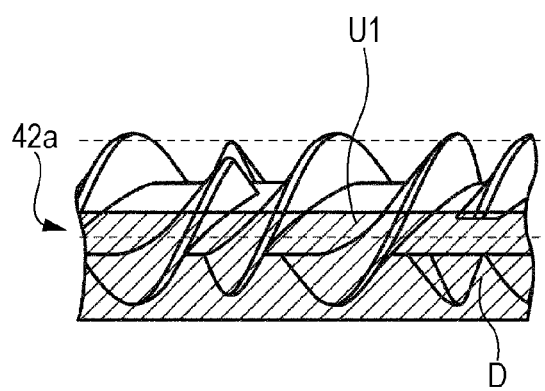
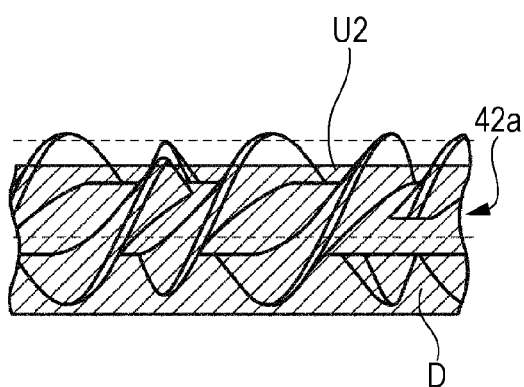

US 9,458,879 B2

TRANSPORTING MEMBER, DEVELOPING DEVICE, AND IMAGE FORMING APPARATUS

CROSS-REFERENCE TO RELATED APPLICATIONS

This application is based on and claims priority under 35 USC 119 from Japanese Patent Application No. 2013-030684 filed Feb. 20, 2013.

BACKGROUND (i) Technical Field

The present invention relates to a transporting member, a developing device, and an image forming apparatus.

(ii) Related Art

Image forming apparatuses, such as a photocopier or a printer, include a developing device for developing electrostatic latent images formed on a photoconductor. The developing device includes a development roller disposed opposite the photoconductor. In the developing device, for example, a two-component developer containing a magnetic carrier and toner mostly made of resin is agitated by a developer-agitating transporting member and supplied to the development roller via a developer-supplying transporting member.

SUMMARY

A transporting member according to an aspect of the invention includes multiple helical blades that helically extend around a rotation shaft and that have an upstream-side blade and a downstream-side blade, an end portion of the upstream-side blade and an end portion of the downstream-side blade overlapping in a direction perpendicular to an axial direction of the rotation shaft, the multiple helical blades transporting an object in the axial direction via rotation of the rotation shaft; a gap portion that divides the upstream-side blade and the downstream-side blade, the upstream-side blade and the downstream-side blade being arranged at a certain angular interval in a circumferential direction of the rotation shaft; and a regulating portion that regulates an amount of the object that passes through a space between the upstream-side blade and the downstream-side blade in a direction in which the object is transported.

BRIEF DESCRIPTION OF THE DRAWINGS

An exemplary embodiment of the present invention will be described in detail based on the following figures, wherein:

FIG. 8A is a front view of part of the developer-agitating transporting member and the position of the upper surface of the developer in the case where the regulating portion is not provided and FIG. 8B is front view of part of the developer-agitating transporting member and the position of the upper surface of the developer in the case where the regulating portion is provided.

DETAILED DESCRIPTION

Figure 1:
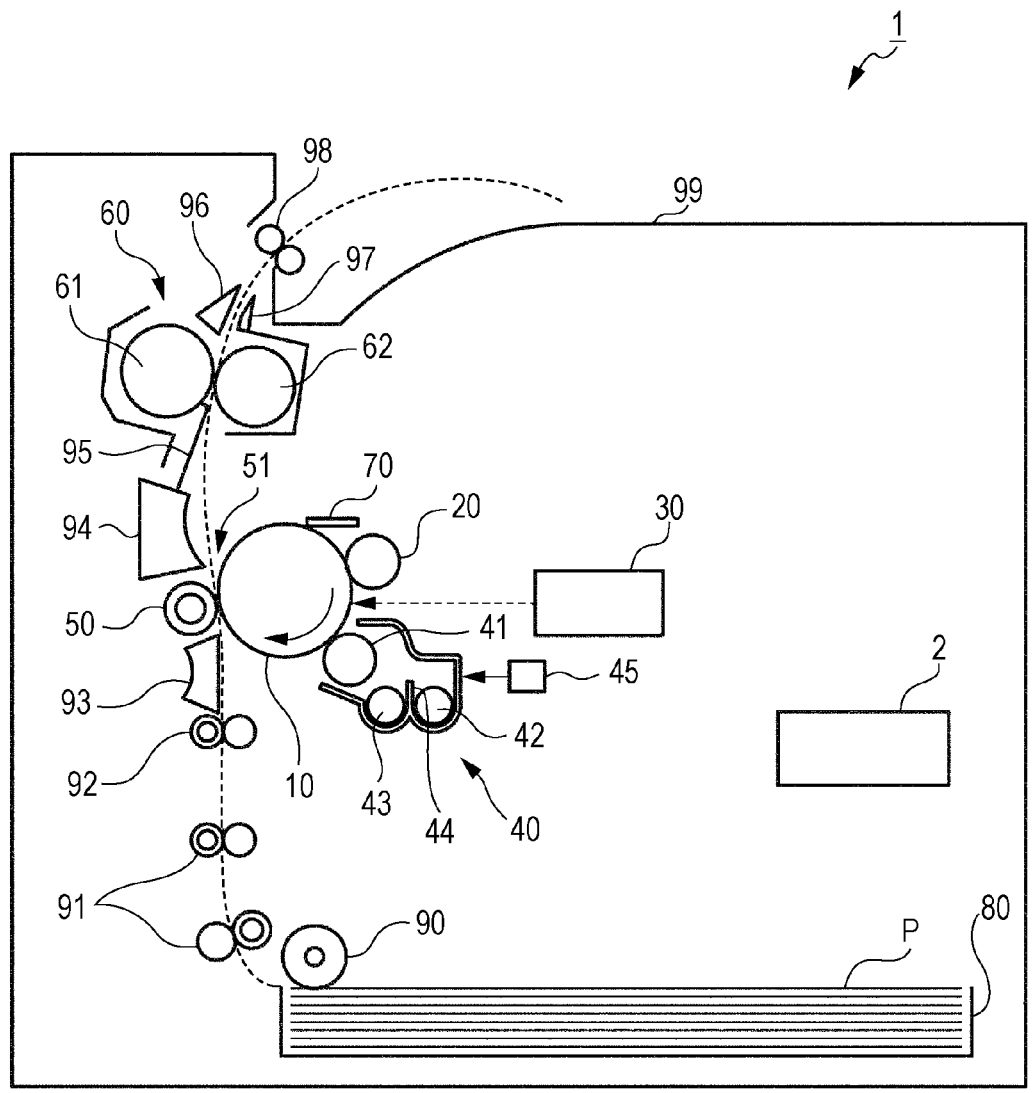
FIG. 1 schematically illustrates an image forming apparatus according to an exemplary embodiment.

Hereinbelow, an exemplary embodiment of the present invention will be described with reference to the drawings. FIG. 1 schematically illustrates the configuration of an image forming apparatus according to the exemplary embodiment including a transporting member and a developing device.

The image forming apparatus 1 according to the exemplary embodiment includes a controller 2, a photoconductor 10, a charging unit 20, an exposing unit 30, a developing device 40, a transfer unit 50, a fixing device 60, a cleaning unit 70, and a sheet storage 80. The image forming apparatus 1 forms an image on a sheet P, which is an example of a recording medium, on the basis of image data supplied thereto.

The controller 2 includes an arithmetic unit, such as a central processing unit (CPU), and a memory to control operations of components of the image forming apparatus 1.

The photoconductor 10 is a cylindrical rotatable body that rotates in a direction of the solid arrow of FIG. 1 and that has a photosensitive layer made of an organic photosensitive material to hold an image.

The charging unit 20 applies a predetermined charging voltage to the surface of the photoconductor 10 using, for example, a charging roller that rotates while coming into contact with the surface of the photoconductor 10. The charging unit 20 may be a contact-type charging unit that charges the photoconductor 10 while coming into contact with the photoconductor 10 using a brush or may be a non-contact-type charging unit that charges the photoconductor 10 using a corona discharge.

The exposure unit 30 emits light based on image data to the surface of the photoconductor 10 charged by the charging unit 20 and forms an electrostatic latent image having a latent image potential by using a potential difference. As the photoconductor 10 rotates, the electrostatic latent image moves to a position at which the developing device 40 is disposed.

The developing device 40 has a rotatable developing roller 41 and toner adhering to the developing roller 41 transfers to the photoconductor 10. Specifically, the toner transfers to the surface of the photoconductor 10 due to there being a potential difference between the charged toner and the electrostatic latent image formed on the photoconductor 10. Consequently, a toner image is formed on the photoconductor 10. The toner image moves to a position at which the transfer unit 50 is disposed as the photoconductor 10 rotates.

A developer-agitating transporting member 42 that agitates toner T and developer D, a developer-supplying transporting member 43 that supplies the developer D to the development roller 41, a partitioning portion 44, and a replenishing unit 45 that supplies the toner T to the developer-agitating transporting member 42 are provided in the developing device 40. The developer-agitating transporting member 42 is an example of a transporting member. Detailed description of the developing device 40 and the developer-agitating transporting member 42 will be described below.

The transfer unit 50 transfers a toner image formed on the photoconductor 10 to a sheet P at a transfer nip portion 51 at which the photoconductor 10 and the transfer unit 50 face each other.

The fixing device 60 includes a fixing roller 61, which includes a heat source, and a pressing roller 62, which is disposed opposite the fixing roller 61. The fixing device 60 fixes an unfixed toner image formed on a sheet P to the sheet P by heating and pressing the toner image.

The cleaning unit 70 removes remnants such as toner remaining on the surface of the photoconductor 10 after the toner image has been transferred to the sheet P.

Multiple sheets P are stored in the sheet storage 80. The sheets P are transported from the sheet storage 80 by a transportation system.

The system of transporting the sheet P in the image forming apparatus 1 according to the exemplary embodiment includes a pick-up roller 90 and transportation rollers 91. The pick-up roller 90 feeds a sheet P stored in the sheet storage 80 at a predetermined timing. The transportation rollers 91 transport the sheet P fed by the pick-up roller 90.

The system of transporting the sheet P also includes a registration roller 92, a guiding member 93, and a guiding member 94. The registration roller 92 aligns and regulates a sheet P that has been transported thereto by the transportation rollers 91 and feeds the sheet P toward the transfer unit 50 at a predetermined timing. The guiding member 93 guides the sheet P fed by the registration roller 92 to the transfer nip portion 51. The guiding member 94 guides the sheet P that has been transported thereto after a toner image has been transferred to the surface of the sheet P to the fixing device 60.

The system of transporting the sheet P also includes a fixing device entry guide 95, ejecting rollers 98, and ejection guides 96 and 97. The fixing device entry guide 95 is disposed upstream from the fixing device 60 and guides the sheet P to which a toner image has been transferred to the fixing device 60. The ejecting rollers 98 eject the sheet P ejected from the fixing device 60 to a recording medium exit portion 99 provided on the surface of the housing of the image forming apparatus 1. The ejection guides 96 and 97 guide the sheet P to the ejecting rollers 98.

Figure 2:
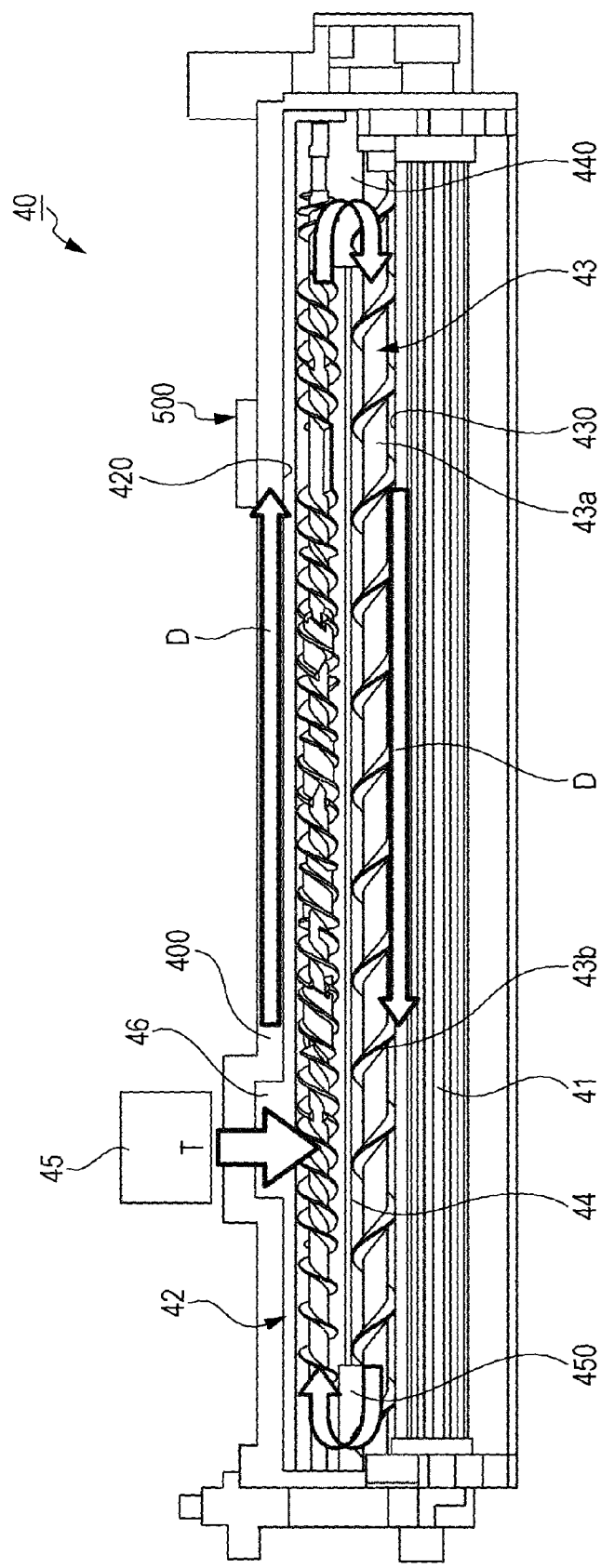
FIG. 2 schematically illustrates a developing device according to the exemplary embodiment in a plan.

Now, the developing device 40 according to the exemplary embodiment will be described in detail. FIG. 2 is a schematic diagram of the inside of the developing device 40 illustrated in FIG. 1. In FIG. 2, the direction in which the toner T is supplied and the direction in which the developer D is transported are indicated by hollow arrows.

Hereinbelow, the side from which the toner T is supplied is referred to as an upstream side and the side to which the developer D is transported is referred to as a downstream side. The developing device 40 according to the exemplary embodiment operates with a so-called two-component-developer development method. A two-component developer is developer D containing toner T and a magnetic carrier. Although a nonmagnetic toner is used as an example of the toner T here, a magnetic toner may be used as long as the electrostatic property of the toner is different from that of the magnetic carrier.

The developing device 40 includes the development roller 41, the developer-agitating transporting member 42, the developer-supplying transporting member 43, the partitioning portion 44, a developer container 400, a density sensor unit 500, which is an example of a sensor, and the replenishing unit 45.

The development roller 41 is disposed opposite the photoconductor 10 illustrated in FIG. 1, the photoconductor 10 rotating while carrying an electrostatic latent image. The development roller holds the developer D and develops the electrostatic latent image on the photoconductor 10 with the developer D.

The developer-agitating transporting member 42 and the developer-supplying transporting member 43 are respectively held in a developer-agitating transportation path 420 and a developer-supplying transportation path 430 formed in the developer container 400 with the partitioning portion 44 interposed between the developer-agitating transporting member 42 and the developer-supplying transporting member 43. Openings 440 and 450 are provided on both ends of the partitioning portion 44. Through the opening 440, developer D is passed from the developer-agitating transportation path 420 to the developer-supplying transportation path 430. Through the opening 450, developer D is passed from the developer-supplying transportation path 430 to the developer-agitating transportation path 420. The development roller 41 and the developer-supplying transportation path 430 are disposed substantially parallel to each other.

A replenisher port 46 that receives toner T from the replenishing unit 45 for replenishment is located at a position between a first end and a middle portion of the developer-agitating transportation path 420 but closer to the first end. The toner T is supplied from the replenishing unit 45 to the developer-agitating transportation path 420 through the replenisher port 46.

The toner T supplied from the replenisher port 46 is transported by the developer-agitating transporting member 42 through the developer-agitating transportation path 420 in a direction of a hollow arrow illustrated in FIG. 2 while being mixed with the developer D.

The developer D transported through the developer-agitating transportation path 420 from the upstream side to the downstream side is passed to the developer-supplying transportation path 430 at the opening 440. The developer D passed to the developer-supplying transportation path 430 is transported by the developer-supplying transporting member 43 through the developer-supplying transportation path 430 in the direction of the arrow illustrated in FIG. 2. The developer-supplying transporting member 43 transports the developer D agitated by and supplied from the developer-agitating transporting member 42 to the development roller 41. The developer-supplying transporting member 43 includes a rotatable shaft 43a and a helical blade 43b mounted on the shaft 43a. While the toner T is transported through the developer-supplying transportation path 430, the toner T adheres to the development roller 41.

The developer D in which the density of toner T has been reduced due to the toner T having adhered to the development roller 41 is passed from the developer-supplying transportation path 430 to the developer-agitating transportation path 420 at the opening 450 and then transported by the developer-agitating transporting member 42 through the developer-agitating transportation path 420 toward the replenisher port 46. Then, a new lot of toner T is supplied from the replenisher port 46 to the developer D. In this manner, the developer D circulates throughout the developer container 400 in the direction of the hollow arrows illustrated in FIG. 2.

A density sensor unit 500 that detects the density of the toner T is attached to the developer-agitating transportation path 420 of the developer container 400. The density sensor unit 500 is located downstream from the replenisher port 46 at a position along the developer-agitating transportation path 420 between a second end and a middle portion of the developer-agitating transportation path 420, the second end being opposite the first end to which the replenisher port 46 is close. As described above, preferably, the density sensor unit 500 is disposed at a position downstream from the replenisher port 46 at which the toner T has been fully mixed into the developer D. By disposing the density sensor unit 500 at a downstream position, the density of toner T in the developer D before the toner T adheres to the development roller 41 is accurately detected.

When the density of toner T in the developer-agitating transportation path 420 detected by the density sensor unit 500 falls below a predetermined range due to development effect, a new lot of developer D is supplied to the developer-agitating transportation path 420 from the replenishing unit 45 through the replenisher port 46.

Figure 3:
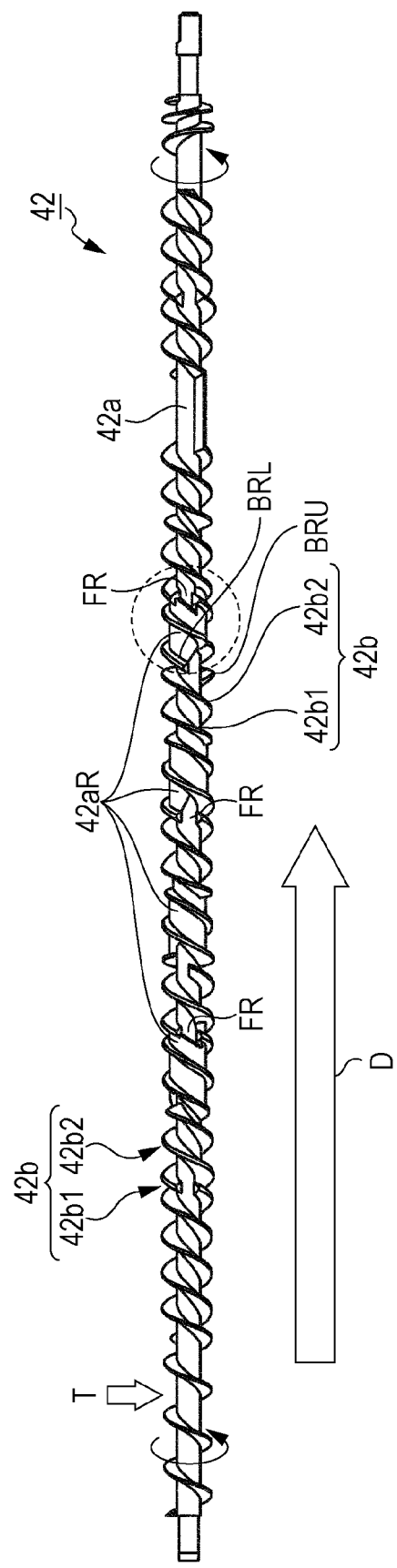
FIG. 3 is a front view of the entirety of a developer-agitating transporting member according to the exemplary embodiment.
Figure 4:
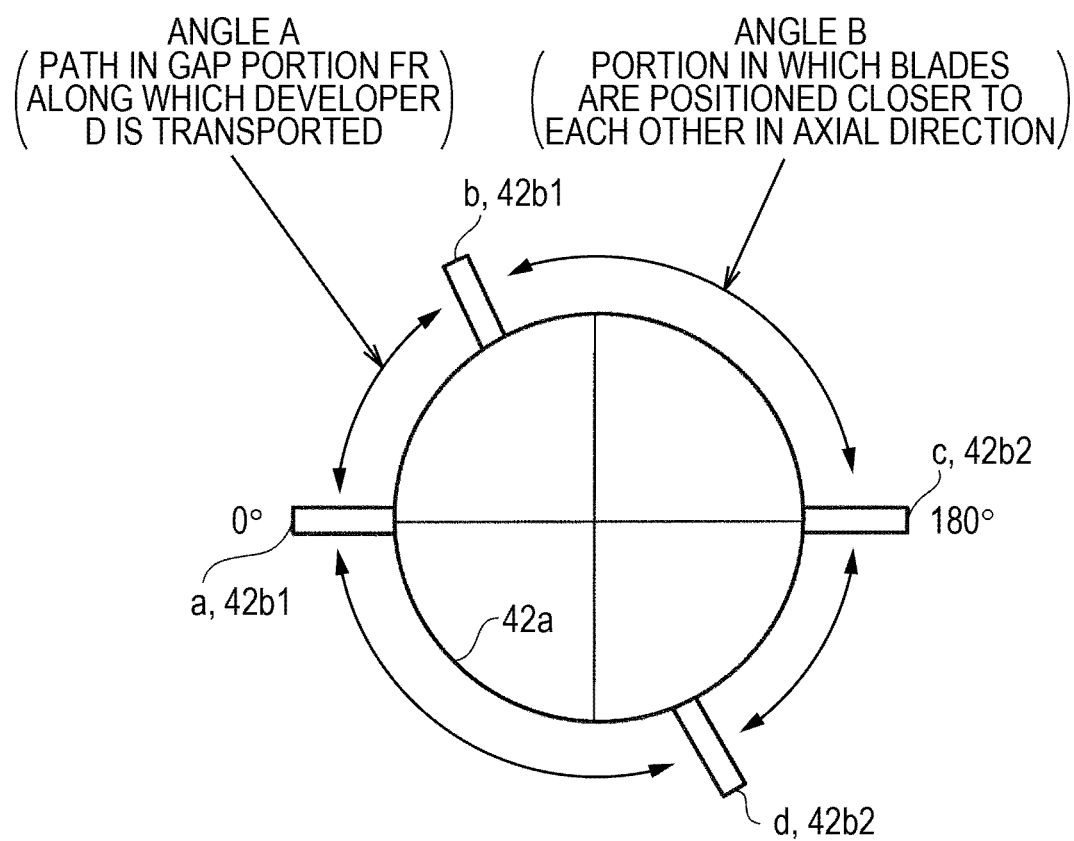
FIG. 4 schematically illustrates the developer-agitating transporting member in a cross section.

FIG. 3 is a front view of the entirety of the developer-agitating transporting member 42. FIG. 4 schematically illustrates the developer-agitating transporting member 42 in a cross section. In FIG. 3, the direction in which the developer D is transported is indicated by a hollow arrow. In addition, the direction in which the developer-agitating transporting member 42 rotates is indicated by a solid arrow while the position at which the toner T is supplied is indicated by a hollow arrow.

In FIG. 3 and FIG. 4, the developer-agitating transporting member 42 includes a shaft 42a, serving as a rotation shaft, and a double-helix blade 42b including two helical blades 42b1 and 42b2 that helically extend around the circumferential surface of the shaft 42a. The two helical blades 42b1 and 42b2 overlap in a direction perpendicular to the axial direction of the rotation shaft 42a. Here, for example, the helical blades 42b1 and 42b2 are arranged at an angular interval of approximately 180° in the circumferential direction of the shaft 42a. The developer-agitating transporting member 42 transports the developer D in the transportation direction via the rotation of the shaft 42a.

Each of the helical blades 42b1 and 42b2 is divided into upstream-side blade portions BRU and downstream-side blade portions BRL by multiple gap portions FR. Each gap portion FR is disposed such that adjacent upstream-side and downstream-side blade portions BRU and BRL are arranged at a certain angular interval in the circumferential direction of the shaft 42a.

FIG. 4 is a cross section of the shaft 42a that illustrates a downstream-side end a of an upstream-side blade portion BRU of the helical blade 42b1 and an upstream-side end b of a downstream-side blade portion BRL, these ends a and b opposing each other with a gap portion FR interposed therebetween. The cross section of the shaft 42a of FIG. 4 also illustrates a downstream-side end c of an upstream-side blade portion BRU of the helical blade 42b2 and an upstream-side end d of a downstream-side blade portion BRL of the helical blade 42b2, these ends c and d opposing each other with another gap portion FR interposed therebetween.

As illustrated in FIG. 4, the relationship $B=180°-A$ is satisfied in the exemplary embodiment, where an angle between a line extending from the downstream-side end a of the upstream-side blade portion BRU to the center of the shaft 42a and a line extending from the upstream-side end b of the downstream-side blade portion BRL to the center of the shaft 42a is defined as an angle A and an angle between a line extending from the upstream-side end b of the downstream-side blade portion BRL to the center of the shaft 42a and a line extending from the downstream-side end c of the upstream-side blade portion BRU to the center of the shaft 42a is defined as an angle B. The angle A is a passage in the gap portion FR over which the developer D is transported and the angle B is a space in which upstream-side and downstream-side blade portions BRU and BRL are positioned closer to each other in the axial direction.

In FIG. 3, the developer-agitating transporting member 42 includes regulating portions 42aR.

The regulating portions 42aR may be formed by increasing the diameter of the shaft 42a or by using other components that are to be attached to the shaft 42a.

Here, the height of the regulating portion 42aR is set to be lower than the height of the helical blades 42b1 and 42b2. Setting the height of the regulating portion 42aR to be lower than the height of the helical blades 42b1 and 42b2 reliably allows a certain amount of developer D to pass over the regulating portion 42aR.

In addition, adjusting the height of the regulating portion 42aR makes the amount of developer D that flows over the regulating portion 42aR adjustable.

In FIG. 2 and FIG. 3, four regulating portions 42aR are illustrated. These illustrations, however, are provided for exemplary purposes only and the number of regulating portions 42aR is not limited to four. These four regulating portions 42aR are disposed while being separated from one another in the direction in which the shaft 42a extends.

Figure 5A:
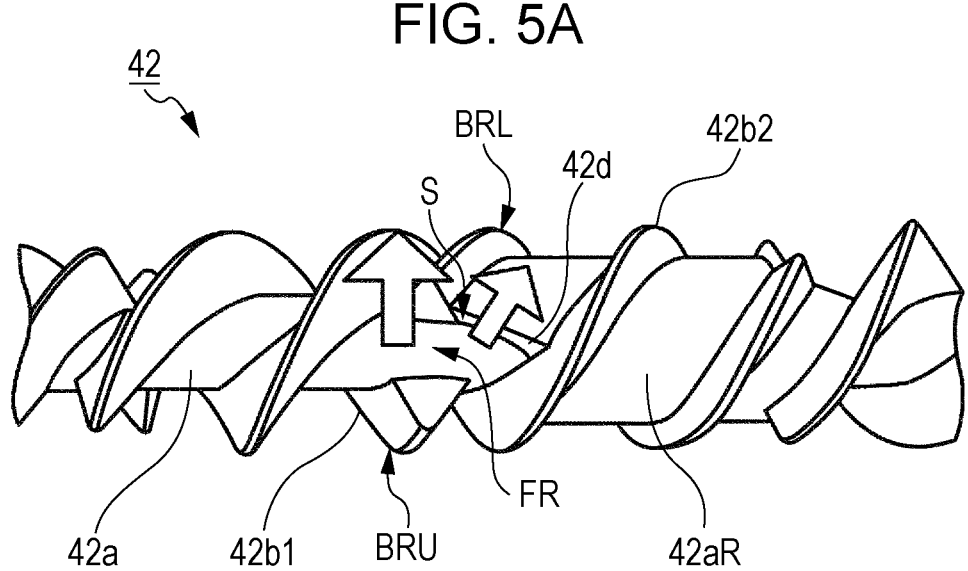
FIG. 5A is a front view of a portion on the upstream side of a regulating portion of the developer-agitating transporting member and FIG. 5B is a schematic view of part of the portion illustrated in FIG. 5A.
Figure 5B:
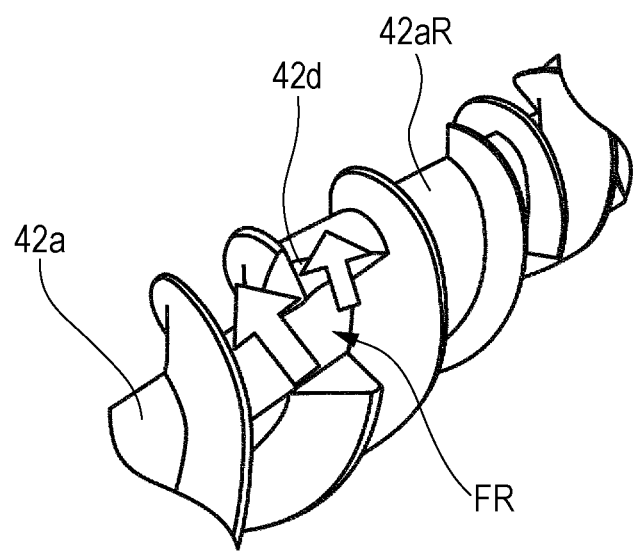
Figure 6:
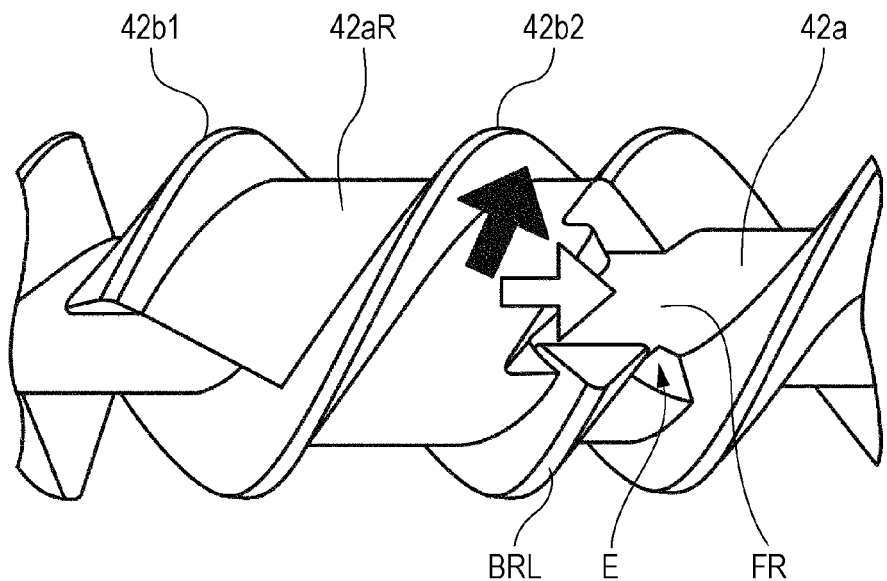
FIG. 6 is a front view of a portion on the downstream side of the regulating portion of the developer-agitating transporting member.
Figure 7:
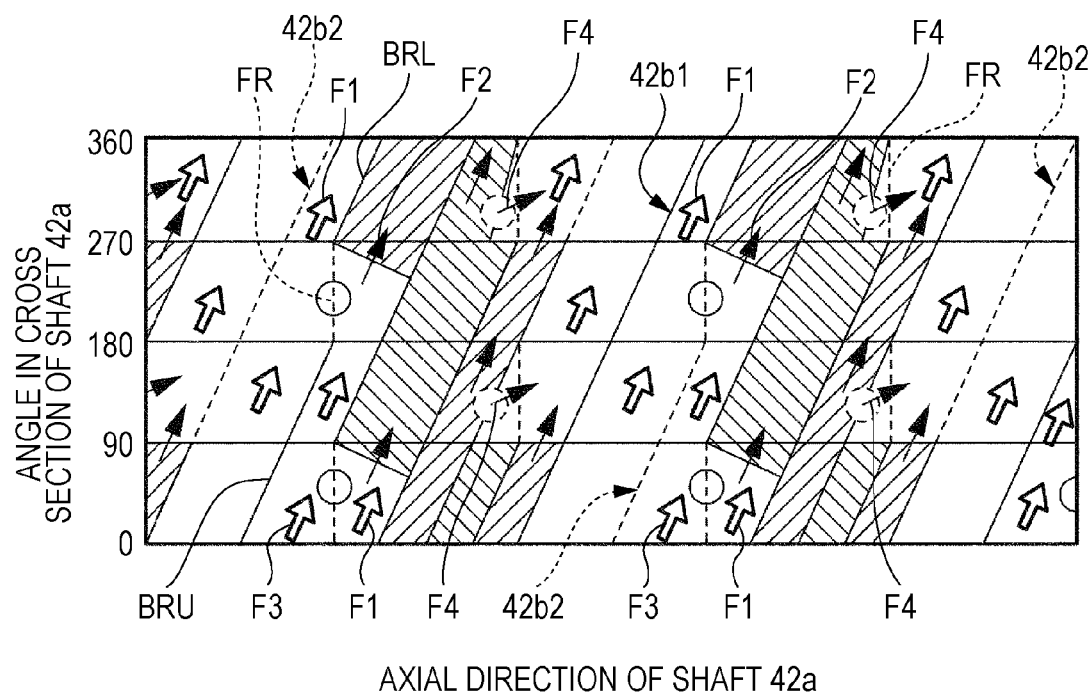
FIG. 7 is a schematic view in which the circumferential surface of the developer-agitating transporting member is unfolded.

With reference to FIGS. 5, 6, and 7, the developer-agitating transporting member 42 and the flow of the developer D in the developer-agitating transporting member 42 are described in detail now.

FIGS. 5A and 5B illustrate the portion encircled by the dotted circle in FIG. 3 in an enlarged manner. FIG. 5A is a front view of a portion upstream from the regulating portion 42aR of the developer-agitating transporting member 42 and FIG. 5B is a perspective view of the portion. FIG. 6 is a front view of a portion downstream from the regulating portion 42aR of the developer-agitating transporting member 42. FIG. 7 is a schematic view in which the circumferential surface of the developer-agitating transporting member 42 is unfolded. Hollow arrows and solid arrows indicate flow of developer D. In FIG. 7, a downstream-side end a of an upstream-side blade portion BRU and an upstream-side end b of a downstream-side blade portion BRL that face each other with a gap portion FR interposed therebetween are located at an angular interval of 90°.

In FIG. 5, a start portion S of a regulating portion 42aR is positioned downstream from the upstream-side end b of the downstream-side blade portion BRL in the transportation direction.

The developer D that has been transported by the rotation of the helical blades 42b1 and 42b2 are divided into two parts at the gap portion FR. Here, the regulating portion 42aR regulates the amount of one part of the developer D that is to pass through a space between the upstream-side blade portion BRU and the downstream-side blade portion BRL in the transportation direction.

Since the amount of developer D is thus regulated, a large amount of developer D becomes separated from the helical blade BRL. In FIG. 5A, the size of the hollow arrows corresponds to the amount of the developer D; the amount of developer D that flows in the direction indicated by the larger hollow arrow is larger than the amount of developer D that flows in the direction indicated by a smaller hollow arrow.

In FIG. 5B, the regulating portion 42aR has an end 42d on the upstream side of the start portion S of the regulating portion 42aR. The end 42d stands at a steep angle with respect to the shaft 42a. Here, the steep angle is an angle ranging from approximately 45 degrees to approximately 135 degrees. The end 42d standing at a steep angle also prevents the developer D from passing through a space between the upstream-side blade portion BRU and the downstream-side blade portion BRL in the transportation direction, thus more developer D becomes separated from the downstream-side blade portion BRL. Preferably, the end 42d is located downstream from the gap portion FR in the transportation direction.

In FIG. 6, an end portion E of the regulating portion 42aR is positioned downstream from the start portion S in the transportation direction and is aligned with a downstream-side end of the downstream-side blade portion BRL.

Here, the end portion E of the regulating portion 42aR may be positioned at any position up to the downstream-side end of the downstream-side blade portion BRL but has to only be downstream from the start portion S in the transportation direction.

The diameter of part of the end portion E of the regulating portion 42aR is tapered so as to be equal to the diameter of the shaft 42a, which has a small diameter and thus efficiently transports the developer D, at the gap portion FR so that part of the developer D changes its direction to the axial direction of the shaft 42a at the gap portion FR.

Hereinbelow, the flow of the developer D is described in detail. In FIG. 7, the flow of the developer D is indicated by hollow arrows and solid arrows. Shaded areas indicate areas over which the regulating portions 42aR are formed.

In FIG. 7, the developer D is divided into a first flow portion F1 and a second flow portion F2 at the gap portions FR encircled by solid circles. The first flow portion F1 of the developer D, which is one of the divided portions of developer D, becomes separated from the downstream-side blade portion BRL and is transported as illustrated in FIG. 7. The first flow portion F1 of the developer D thus transported delays one cycle by being separated from the downstream-side blade portion BRL.

Providing the gap portions FR allows the double-helix blade 42b to improve its performances of transporting the developer D in the axial direction and agitating and mixing the developer D.

Here, since the regulating portions 42aR regulate the amount of developer D that passes through a space between the upstream-side and downstream-side blade portions BRU and BRL, which are not continuous with each other, in the transportation direction, the amount of the first flow portion F1 is larger than that of the second flow portion F2. The first flow portion F1 mixes with a third flow F3 of the developer D that merges with the first flow portion F1. Since the amount of the first flow portion F1 is large, the first flow portion F1 mixes well with the merging third flow F3 of the developer D, so that the developer D is more efficiently agitated and the toner T is distributed further.

On the other hand, the second flow portion F2 out of the divided portions of the developer D is transported by a blade portion BRL over the regulating portion 42aR toward the downstream side. Portions encircled by dotted circles indicate portions near gap portions FR on the downstream side of the regulating portions 42aR.

Since the diameter of part of the regulating portion 42aR is tapered so as to be equal to the diameter of the shaft portion 42a at the downstream-side gap portion FR encircled by a dotted circle, a fourth flow F4 that moves in the direction of the shaft portion 42a occurs in the downstream-side gap portions FR, whereby the developer D is reliably transported.

FIGS. 8A and 8B are front views of part of the developer-agitating transporting member 42 and the position of the upper surface of the developer D in the cases where the regulating portions 42aR are provided and not provided. Although the regulating portions 42aR themselves are not illustrated, the FIG. 8A corresponds to the case where the regulating portions 42aR are not provided and FIG. 8B corresponds to the case where the regulating portions 42aR are provided.

In FIGS. 8A and 8B, in the case where the regulating portions 42aR are provided, the upper surface U2 of the developer D is higher than the upper surface U1 of the developer D in the case where the regulating portions 42aR are not provided because the regulating portions 42aR impede the transportation of part of the developer D. By making the upper surface U2 of the developer D higher, the developer D is efficiently spread over the entirety of the developer-agitating transporting member 42 in the circumferential direction.

The developer-agitating transporting member 42 according to the exemplary embodiment includes multiple regulating portions 42aR, which increase the diameter of the shaft 42a, positioned at intervals. Thus, the developer-agitating transporting member 42 exerts a high performance of agitating and dispersing the developer without adversely affecting the performance of transporting the developer to a large degree or without affecting a balance between retention and flow of the developer D.

The regulating portions 42aR intermittently reduce the distance between the wall surface of the developer-agitating transportation path 420 and the shaft 42a, whereby the transported developer D that passes through the space therebetween is repeatedly compressed and released so that lumps of toner T are capable of being ground. Consequently, the driving torque of the developer-agitating transporting member 42 is prevented from rising.

The number of regulating portions 42aR provided is determined appropriately. In order to effectively mix the two-component developer, the regulating portions 42aR are preferably provided on the downstream side from the replenisher port 46, on which the developer D is not mixed well due to a supply of a new lot of toner T.

The developer-agitating transporting member 42 according to the exemplary embodiment includes a double-helix blade, but the present invention is not limited to this. For example, the developer-agitating transporting member 42 may include a multi-helix blade such as triple-helix or more-helix blades. A developer-agitating transporting member including such a multi-helix blade has a larger area on the surface on which the developer is transported and a higher transporting efficiency in the axial direction.

The exemplary embodiment illustrates an example where a multi-helix blade having gap portions FR is used as the developer-agitating transporting member 42. However, in order to improve the performance of transporting the developer in the axial direction and the performances of agitating and mixing the developer, a multi-helix blade having gap portions FR may be used as the developer-supplying transporting member 43 or another member that agitates or transports the developer (such as a dispense auger disposed in the toner supply path).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transporting member comprising:
    a plurality of helical blades that helically extend around a rotation shalt, the plurality of helical blades having an upstream-side blade and a downstream-side blade, an end portion of the upstream-side blade and an end portion of the downstream-side blade overlapping in a direction perpendicular to an axial direction of the rotation shaft, the plurality of helical blades configured to transport an object in the axial direction via rotation of the rotation shaft;
    a gap portion that divides the upstream-side blade and the downstream-side blade, the upstream-side blade and the downstream-side blade being arranged at a certain angular interval in a circumferential direction of the rotation shaft; and
    a regulating portion that regulates an amount of the object that passes through a space between the upstream-side blade and the downstream-side blade in a direction in which the object is transported,
    wherein a distance, in a direction perpendicular to the rotation shaft, between an outer surface of the regulating portion and an outermost portion of the upstream-side blade and the downstream-side blade being smaller than a distance, in the direction perpendicular to the rotation shaft, between the rotating shaft and the outermost portion of the upstream-side blade and the downstream-side blade, and
    wherein an end surface of the regulating portion is disposed between the end portion of the upstream-side blade and the end portion of the downstream-side blade overlapping in the direction perpendicular to the axial direction of the rotation shaft.

2. The transporting member according to claim 1, wherein the regulating portion is located downstream from the downstream-side blade.

3. The transporting member according to claim 2, wherein the regulating portion is located at any position up to a downstream-side end of the downstream-side blade.

4. The transporting member according to claim 1, wherein the regulating portion has an upstream-side end that stands at a steep angle with respect to the rotation shaft.

5. The transporting member according to claim 2, wherein the regulating portion has an upstream-side end that stands at a steep angle with respect to the rotation shaft.

6. The transporting member according to claim 3, wherein the regulating portion has an upstream-side end that stands at a steep angle with respect to the rotation shaft.

7. A developing device comprising:
    the transporting member according to claim 1; and
    a sensor that detects a density of toner in developer serving as the object,
    wherein the regulating portion is located upstream from the sensor in the direction in which the object is transported.

8. The developing device according to claim 7, further comprising:
    a replenisher port through which the toner is supplied to the transporting member,
    wherein the regulating portion is located downstream from the replenisher port in the direction in which the developer is transported.

9. An image forming apparatus comprising:
    eloping device according to claim 7,
    wherein the apparatus forms an image on a recording medium supplied to the apparatus.

* * * * *